US012068823B2

(12) United States Patent
Dalsgaard et al.

(10) Patent No.: US 12,068,823 B2
(45) Date of Patent: Aug. 20, 2024

(54) APPARATUS, METHOD AND COMPUTER PROGRAM

(71) Applicant: NOKIA TECHNOLOGIES OY, Espoo (FI)

(72) Inventors: Lars Dalsgaard, Oulu (FI); Tero Henttonen, Espoo (FI); Elena Virtej, Espoo (FI); Jarkko Tuomo Koskela, Oulu (FI)

(73) Assignee: NOKIA TECHNOLOGIES, Espoo (FI)

( * ) Notice: Subject to any disclaimer, the term of this patent is extended or adjusted under 35 U.S.C. 154(b) by 351 days.

(21) Appl. No.: 17/428,817

(22) PCT Filed: Feb. 14, 2019

(86) PCT No.: PCT/EP2019/053707
§ 371 (c)(1),
(2) Date: Aug. 5, 2021

(87) PCT Pub. No.: WO2020/164716
PCT Pub. Date: Aug. 20, 2020

(65) Prior Publication Data
US 2022/0131584 A1 Apr. 28, 2022

(51) Int. Cl.
*H04W 36/04* (2009.01)
*H04B 7/06* (2006.01)
*H04L 5/00* (2006.01)

(52) U.S. Cl.
CPC ......... *H04B 7/0626* (2013.01); *H04L 5/0048* (2013.01)

(58) Field of Classification Search
CPC ......... H04L 5/0048; H04L 5/005; H04L 1/20; H04B 7/0626; H04B 17/328; H04W 24/10; H04W 36/0085
See application file for complete search history.

(56) References Cited

U.S. PATENT DOCUMENTS

| 2016/0037425 A1* | 2/2016 | Van Lieshout ... H04W 36/0088 370/332 |
| 2019/0007881 A1* | 1/2019 | Ramachandra ....... H04W 48/12 |
| 2019/0020454 A1 | 1/2019 | Kim et al. |

FOREIGN PATENT DOCUMENTS

EP 2 860 883 A1 4/2015

OTHER PUBLICATIONS

International Search Report and Written Opinion dated Oct. 29, 2019 corresponding to International Patent Application No. PCT/EP2019/053707.

* cited by examiner

*Primary Examiner* — Anez C Ebrahim
(74) *Attorney, Agent, or Firm* — Lippes Mathias LLP (57) ABSTRACT

An apparatus comprising means for: receiving a first message, the first message comprising reference signal resource information for measuring channel state information; causing the apparatus, when operating the apparatus in a first radio resource control mode, to measure channel state information based on a reference signal of the channel state information.

12 Claims, 5 Drawing Sheets

APPARATUS, METHOD AND COMPUTER PROGRAM

FIELD

The present application relates to a method, apparatus, system and computer program and in particular but not exclusively to dual connectivity/carrier aggregation within cellular communication systems such as NR.

BACKGROUND

A communication system can be seen as a facility that enables communication sessions between two or more entities such as user terminals, base stations and/or other nodes by providing carriers between the various entities involved in the communications path. A communication system can be provided for example by means of a communication network and one or more compatible communication devices. The communication sessions may comprise, for example, communication of data for carrying communications such as voice, video, electronic mail (email), text message, multimedia and/or content data and so on. Non-limiting examples of services provided comprise two-way or multi-way calls, data communication or multimedia services and access to a data network system, such as the Internet.

In a wireless communication system at least a part of a communication session between at least two stations occurs over a wireless link. Examples of wireless systems comprise public land mobile networks (PLMN), satellite based communication systems and different wireless local networks, for example wireless local area networks (WLAN). The wireless systems can typically be divided into cells, and are therefore often referred to as cellular systems.

A user can access the communication system by means of an appropriate communication device or terminal. A communication device of a user may be referred to as user equipment (UE) or user device. A communication device is provided with an appropriate signal receiving and transmitting apparatus for enabling communications, for example enabling access to a communication network or communications directly with other users. The communication device may access a carrier provided by a station, for example a base station of a cell, and transmit and/or receive communications on the carrier.

The communication system and associated devices typically operate in accordance with a given standard or specification which sets out what the various entities associated with the system are permitted to do and how that should be achieved. Communication protocols and/or parameters which shall be used for the connection are also typically defined. One example of a communications system is UTRAN (3G radio). Other examples of communication systems are the long-term evolution (LTE) of the Universal Mobile Telecommunications System (UMTS) radio-access technology and so-called 5G or New Radio (NR) networks. NR is being standardized by the 3rd Generation Partnership Project (3GPP).

SUMMARY

In a first aspect there is provided an apparatus, said apparatus comprising means for: receiving a first message, the first message comprising reference signal resource information for measuring channel state information; causing the apparatus, when operating the apparatus in a first radio resource control mode, to measure channel state information based on a reference signal of the channel state information.

The means may be further for utilizing the measured channel state information based on the reference signal of the channel state information to control the apparatus changing from the first radio resource control mode to a second radio resource control mode.

The means may be further for causing the apparatus to operate in the first radio resource control mode based on at least one of: the received first message; and a received second message.

The second message may comprise a session information block.

The means for causing the apparatus, when operating the apparatus in a first radio resource control mode, to measure channel state information based on a reference signal of the channel state information may be further for controlling the measuring of the channel state information based on the reference signal reference signal of the channel state information based on at least one of: an area condition; and a time condition.

The means for controlling the measuring of the channel state information based on the reference signal reference signal of the channel state information based on the area condition may be further for one of: limiting measurement of the channel state information based on the reference signal reference signal of the channel state information to a cell where the apparatus transitioned to the first radio resource mode; limiting measurement of the channel state information based on the reference signal reference signal of the channel state information to an area based on area information within the first message, the area information within the first message comprising at least one of: a radio access network area; at least one gNB identity; at least one cell identity; and at least one tracking area; and limiting measurement of the channel state information based on the reference signal reference signal of the channel state information based on an area which forces the apparatus to transition to the second mode.

The means for controlling the measuring of the channel state information based on the reference signal reference signal of the channel state information based on the time condition may be further for one of: limiting measurement of the channel state information based on the reference signal reference signal of the channel state information to a time following the transition to the first radio resource mode based on time information within the first message; and limiting measurement of the channel state information based on the reference signal reference signal of the channel state information to a time following the transition to the first radio resource mode based on a fixed predetermined time.

The means for causing the apparatus, when operating the apparatus in the first radio resource control mode, to measure channel state information based on the reference signal of the channel state information may be further for controlling the measuring of the channel state information based on the reference signal of the channel state information based on at least one measurement parameter.

The means for may be further for measuring the at least one measurement parameter.

The means for measuring the at least one measurement parameter may be for measuring the at least one measurement parameter based on at least one of: Reference Signal Received Power; Reference Signal Received Quality; received beam information; and channel state information— reference signal.

The means for controlling the measuring of the channel state information based on the reference signal of the channel state information based on the at least one measurement parameter may be further for at least one of: limiting measurement of the reference signal of the channel state information when the measurement parameter is less than a determined threshold value; starting or restarting measurement of the reference signal of the channel state information when the measurement parameter is greater than a further determined threshold value.

The determined threshold value and the determined threshold value may be one of: different values; and same values.

According to a second aspect there is provided an apparatus, comprising means for: providing, to a user equipment a first message, the first message comprising reference signal resource information for measuring channel state information; causing the user equipment, when the user equipment is in a first radio resource control mode, to measure channel state information based on a reference signal of the channel state information based on the reference signal resource information.

The measured channel state information based on a reference signal of the channel state information may be for assisting the user equipment transition from the first radio resource control mode to a second radio resource control mode.

The first message may comprise information to cause the user equipment to transition to the first radio resource control mode.

The means for may be further for limiting transmitting of the reference signal of the channel state information to the user equipment based on at least one of: an area condition; and a time condition.

The means for limiting transmitting of the reference signal of the channel state information to the user equipment based on the area condition may be further for one of: limiting transmission of the reference signal of the channel state information to a cell where the user equipment transitioned to the first radio resource mode; limiting transmission of the reference signal of the channel state information to an area based at least one of: a radio access network area; at least one gNB identity; at least one cell identity; and at least one tracking area.

The means for limiting transmitting of the reference signal of the channel state information to the user equipment based on the area condition may be further for one of: limiting transmission of the reference signal of the channel state information to a time following the transition of the user equipment to the first radio resource mode based on time information within the first message; limiting transmission of the reference signal of the channel state information to a time following the transition of the user equipment to the first radio resource mode based on serving or other cell measurement results; and limiting transmission of the reference signal of the channel state information to a time following the transition to the first radio resource mode based on a fixed predetermined time.

The first radio resource mode may be one of an IDLE radio resource mode; and an INACTIVE radio resource mode.

The second radio resource mode may be a CONNECTED radio resource mode. In a third aspect, there is provided a method comprising: receiving a first message, the first message comprising reference signal resource information for measuring channel state information; causing an apparatus, when operating the apparatus in a first radio resource control mode, to measure channel state information based on a reference signal of the channel state information.

The method may further comprise utilizing the measured channel state information based on the reference signal of the channel state information to control the apparatus changing from the first radio resource control mode to a second radio resource control mode.

The method may further comprise causing the apparatus to operate in the first radio resource control mode based on at least one of: the received first message; and a received second message.

The second message may comprise a session information block.

Causing the apparatus, when operating the apparatus in a first radio resource control mode, to measure channel state information based on a reference signal of the channel state information may further comprise controlling the measuring of the channel state information based on the reference signal reference signal of the channel state information based on at least one of: an area condition; and a time condition.

Controlling the measuring of the channel state information based on the reference signal reference signal of the channel state information based on the area condition may further comprise one of: limiting measurement of the channel state information based on the reference signal reference signal of the channel state information to a cell where the apparatus transitioned to the first radio resource mode; limiting measurement of the channel state information based on the reference signal reference signal of the channel state information to an area based on area information within the first message, the area information within the first message comprising at least one of: a radio access network area; at least one gNB identity; at least one cell identity; and at least one tracking area; and limiting measurement of the channel state information based on the reference signal reference signal of the channel state information based on an area which forces the apparatus to transition to the second mode.

Controlling the measuring of the channel state information based on the reference signal reference signal of the channel state information based on the time condition may further comprise one of: limiting measurement of the channel state information based on the reference signal reference signal of the channel state information to a time following the transition to the first radio resource mode based on time information within the first message; and limiting measurement of the channel state information based on the reference signal reference signal of the channel state information to a time following the transition to the first radio resource mode based on a fixed predetermined time.

Causing the apparatus, when operating the apparatus in the first radio resource control mode, to measure channel state information based on the reference signal of the channel state information may further comprise controlling the measuring of the channel state information based on the reference signal of the channel state information based on at least one measurement parameter.

The method may further comprise measuring the at least one measurement parameter.

Measuring the at least one measurement parameter may further comprise measuring the at least one measurement parameter based on at least one of: Reference Signal Received Power; Reference Signal Received Quality; received beam information; and channel state information—reference signal.

Controlling the measuring of the channel state information based on the reference signal of the channel state information based on the at least one measurement parameter may further comprise for at least one of: limiting measurement of the reference signal of the channel state information when the measurement parameter is less than a determined threshold value; starting or restarting measurement of the reference signal of the channel state information when the measurement parameter is greater than a further determined threshold value.

The determined threshold value and the determined threshold value may be one of: different values; and same values.

According to a fourth aspect there is provided a method comprising: providing, to a user equipment a first message, the first message comprising reference signal resource information for measuring channel state information; causing the user equipment, when the user equipment is in a first radio resource control mode, to measure channel state information based on a reference signal of the channel state information based on the reference signal resource information.

The measured channel state information based on a reference signal of the channel state information may be for assisting the user equipment transition from the first radio resource control mode to a second radio resource control mode.

The first message may comprise information to cause the user equipment to transition to the first radio resource control mode.

The method may further comprise limiting transmitting of the reference signal of the channel state information to the user equipment based on at least one of: an area condition; and a time condition.

Limiting transmitting of the reference signal of the channel state information to the user equipment based on the area condition may further comprise one of: limiting transmission of the reference signal of the channel state information to a cell where the user equipment transitioned to the first radio resource mode; limiting transmission of the reference signal of the channel state information to an area based at least one of: a radio access network area; at least one gNB identity; at least one cell identity; and at least one tracking area.

Limiting transmitting of the reference signal of the channel state information to the user equipment based on the area condition may further comprise one of: limiting transmission of the reference signal of the channel state information to a time following the transition of the user equipment to the first radio resource mode based on time information within the first message; limiting transmission of the reference signal of the channel state information to a time following the transition of the user equipment to the first radio resource mode based on serving or other cell measurement results; and limiting transmission of the reference signal of the channel state information to a time following the transition to the first radio resource mode based on a fixed predetermined time.

The first radio resource mode may be one of an IDLE radio resource mode; and an INACTIVE radio resource mode.

The second radio resource mode may be a CONNECTED radio resource mode. In a fifth aspect there is provided an apparatus comprising: at least one processor and at least one memory including a computer program code, the at least one memory and computer program code configured to, with the at least one processor, cause the apparatus at least to: receive a first message, the first message comprising reference signal resource information for measuring channel state information; cause the apparatus, when operating the apparatus in a first radio resource control mode, to measure channel state information based on a reference signal of the channel state information.

The apparatus may be further caused to utilize the measured channel state information based on the reference signal of the channel state information to control the apparatus changing from the first radio resource control mode to a second radio resource control mode.

The apparatus may be further caused to cause the apparatus to operate in the first radio resource control mode based on at least one of: the received first message; and a received second message.

The second message may comprise a session information block.

The apparatus caused to cause the apparatus, when operating the apparatus in a first radio resource control mode, to measure channel state information based on a reference signal of the channel state information may be further caused to control the measuring of the channel state information based on the reference signal reference signal of the channel state information based on at least one of: an area condition; and a time condition.

The apparatus caused to control the measuring of the channel state information based on the reference signal reference signal of the channel state information based on the area condition may be further caused to perform one of: limit measurement of the channel state information based on the reference signal reference signal of the channel state information to a cell where the apparatus transitioned to the first radio resource mode; limit measurement of the channel state information based on the reference signal reference signal of the channel state information to an area based on area information within the first message, the area information within the first message comprising at least one of: a radio access network area; at least one gNB identity; at least one cell identity; and at least one tracking area; and limiting measurement of the channel state information based on the reference signal reference signal of the channel state information based on an area which forces the apparatus to transition to the second mode.

The apparatus caused to control the measuring of the channel state information based on the reference signal reference signal of the channel state information based on the time condition may be further caused to perform one of: limit measurement of the channel state information based on the reference signal reference signal of the channel state information to a time following the transition to the first radio resource mode based on time information within the first message; and limit measurement of the channel state information based on the reference signal reference signal of the channel state information to a time following the transition to the first radio resource mode based on a fixed predetermined time.

The apparatus caused to cause the apparatus, when operating the apparatus in the first radio resource control mode, to measure channel state information based on the reference signal of the channel state information may be further caused to control the measuring of the channel state information based on the reference signal of the channel state information based on at least one measurement parameter.

The apparatus may be further caused to measure the at least one measurement parameter.

The apparatus caused to measure the at least one measurement parameter may be further caused to measure the at least one measurement parameter based on at least one of: Reference Signal Received Power; Reference Signal Received Quality; received beam information; and channel state information—reference signal.

The apparatus caused to control the measuring of the channel state information based on the reference signal of the channel state information based on the at least one measurement parameter may be further caused to perform at least one of: limit measurement of the reference signal of the channel state information when the measurement parameter is less than a determined threshold value; start or restart measurement of the reference signal of the channel state information when the measurement parameter is greater than a further determined threshold value.

The determined threshold value and the determined threshold value may be one of: different values; and same values.

According to a sixth aspect there is provided an apparatus, comprising: at least one processor and at least one memory including a computer program code, the at least one memory and computer program code configured to, with the at least one processor, cause the apparatus at least to: provide, to a user equipment a first message, the first message comprising reference signal resource information for measuring channel state information; cause the user equipment, when the user equipment is in a first radio resource control mode, to measure channel state information based on a reference signal of the channel state information based on the reference signal resource information.

The apparatus caused to measure channel state information based on a reference signal of the channel state information may be caused to assist the user equipment transition from the first radio resource control mode to a second radio resource control mode.

The first message may comprise information to cause the user equipment to transition to the first radio resource control mode.

The apparatus may be further caused to limit transmitting of the reference signal of the channel state information to the user equipment based on at least one of: an area condition; and a time condition.

The apparatus caused to limit transmitting of the reference signal of the channel state information to the user equipment based on the area condition may be further caused to perform one of: limit transmission of the reference signal of the channel state information to a cell where the user equipment transitioned to the first radio resource mode; limit transmission of the reference signal of the channel state information to an area based at least one of: a radio access network area; at least one gNB identity; at least one cell identity; and at least one tracking area.

The apparatus caused to limit transmitting of the reference signal of the channel state information to the user equipment based on the area condition may be further caused to perform one of: limit transmission of the reference signal of the channel state information to a time following the transition of the user equipment to the first radio resource mode based on time information within the first message; limit transmission of the reference signal of the channel state information to a time following the transition of the user equipment to the first radio resource mode based on serving or other cell measurement results; and limit transmission of the reference signal of the channel state information to a time following the transition to the first radio resource mode based on a fixed predetermined time.

The first radio resource mode may be one of an IDLE radio resource mode; and an INACTIVE radio resource mode.

The second radio resource mode may be a CONNECTED radio resource mode. According to a seventh aspect there is provided a computer readable medium comprising program instructions for causing an apparatus to perform at least the following causing: receiving a first message, the first message comprising reference signal resource information for measuring channel state information; causing the apparatus, when operating the apparatus in a first radio resource control mode, to measure channel state information based on a reference signal of the channel state information.

According to an eighth aspect there is provided a computer readable medium comprising program instructions for causing an apparatus to perform at least the following causing: providing, to a user equipment a first message, the first message comprising reference signal resource information for measuring channel state information; causing the user equipment, when the user equipment is in a first radio resource control mode, to measure channel state information based on a reference signal of the channel state information based on the reference signal resource information.

According to a ninth aspect there is provided an apparatus comprising: receiving circuitry configured to receive a first message, the first message comprising reference signal resource information for measuring channel state information; controlling circuitry configured to cause the apparatus, when operating the apparatus in a first radio resource control mode, to measure channel state information based on a reference signal of the channel state information.

According to a tenth aspect there is provided an apparatus comprising: providing circuitry configured to provide, to a user equipment a first message, the first message comprising reference signal resource information for measuring channel state information; controlling circuitry configured to cause the user equipment, when the user equipment is in a first radio resource control mode, to measure channel state information based on a reference signal of the channel state information based on the reference signal resource information.

According to an eleventh aspect there is provided a computer program comprising instructions [or a computer readable medium comprising program instructions] for causing an apparatus to perform at least the following: receiving circuitry configured to receive a first message, the first message comprising reference signal resource information for measuring channel state information; controlling circuitry configured to cause the apparatus, when operating the apparatus in a first radio resource control mode, to measure channel state information based on a reference signal of the channel state information.

According to a twelfth aspect there is provided a computer program comprising instructions [or a computer readable medium comprising program instructions] for causing an apparatus to perform at least the following: providing, to a user equipment a first message, the first message comprising reference signal resource information for measuring channel state information; causing the user equipment, when the user equipment is in a first radio resource control mode, to measure channel state information based on a reference signal of the channel state information based on the reference signal resource information.

According to a thirteenth aspect there is provided a non-transitory computer readable medium comprising program instructions for causing an apparatus to perform at least the following: receiving circuitry configured to receive a first message, the first message comprising reference signal resource information for measuring channel state information; controlling circuitry configured to cause the apparatus, when operating the apparatus in a first radio resource control mode, to measure channel state information based on a reference signal of the channel state information.

According to a fourteenth aspect there is provided a non-transitory computer readable medium comprising program instructions for causing an apparatus to perform at least the following: providing, to a user equipment a first message, the first message comprising reference signal resource information for measuring channel state information; causing the user equipment, when the user equipment is in a first radio resource control mode, to measure channel state information based on a reference signal of the channel state information based on the reference signal resource information.

An apparatus comprising means for performing the actions of the method as described above.

An apparatus configured to perform the actions of the method as described above.

A computer program comprising program instructions for causing a computer to perform the method as described above.

A computer program product stored on a medium may cause an apparatus to perform the method as described herein.

An electronic device may comprise apparatus as described herein.

A chipset may comprise apparatus as described herein.

Embodiments of the present application aim to address problems associated with the state of the art. In the above, many different embodiments have been described. It should be appreciated that further embodiments may be provided by the combination of any two or more of the embodiments described above.

DESCRIPTION OF FIGURES

Embodiments will now be described, by way of example only, with reference to the accompanying Figures in which.

DETAILED DESCRIPTION

Before explaining in detail the examples, certain general principles of a wireless communication system and mobile communication devices are briefly explained with reference to FIGS. 1 to 3 to assist in understanding the technology underlying the described examples.

Figure 1:
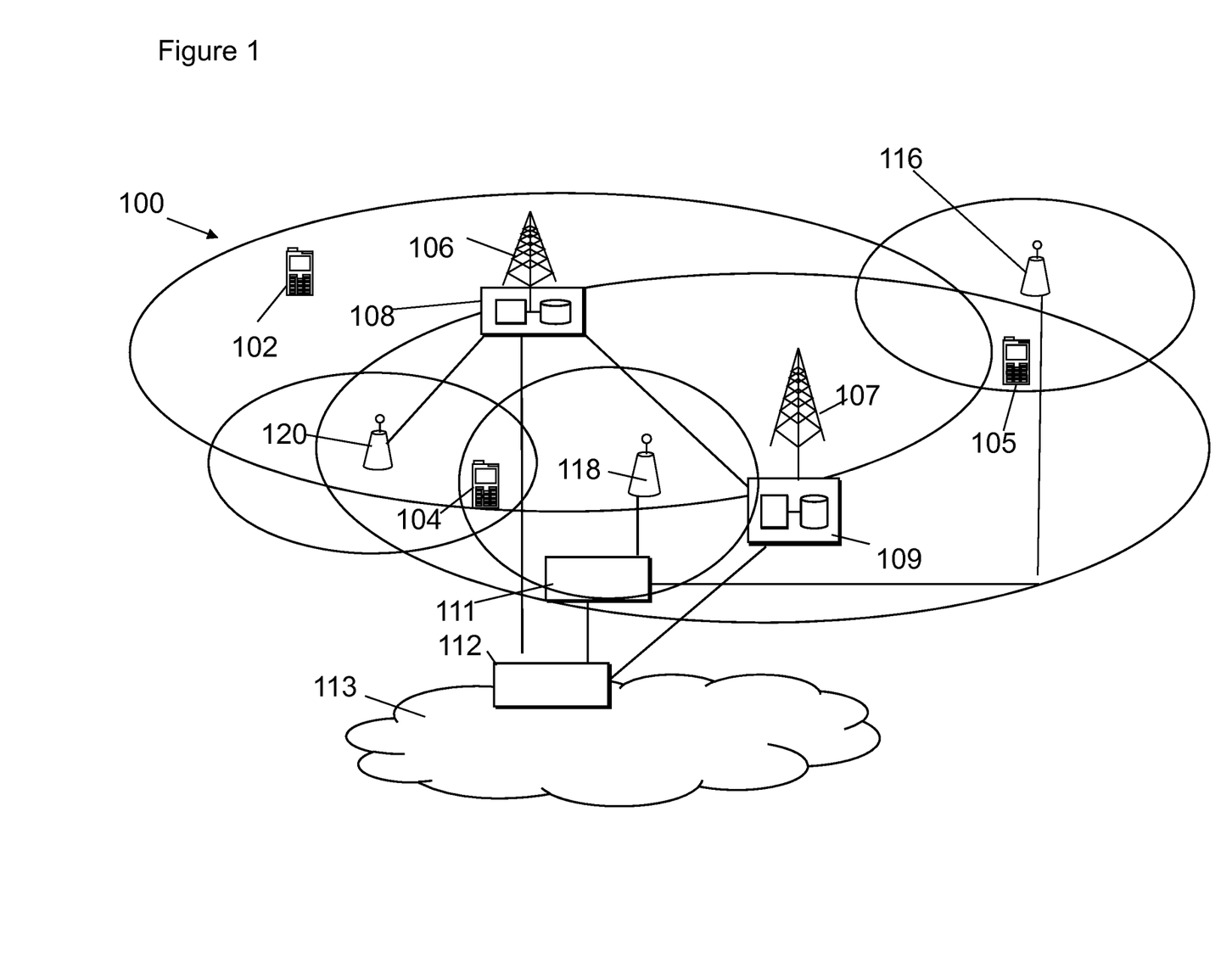
FIG. 1 shows a schematic diagram of an example communication system comprising a base station and a plurality of communication devices.

In a wireless communication system 100, such as that shown in FIG. 1, mobile communication devices or user equipment (UE) 102, 104, 105 are provided wireless access via at least one base station or similar wireless transmitting and/or receiving node or point. Base stations are typically controlled by at least one appropriate controller apparatus, so as to enable operation thereof and management of mobile communication devices in communication with the base stations. The controller apparatus may be located in a radio access network (e.g. wireless communication system 100) or in a core network (CN) (not shown) and may be implemented as one central apparatus or its functionality may be distributed over several apparatuses. The controller apparatus may be part of the base station and/or provided by a separate entity such as a Radio Network Controller. In FIG. 1 control apparatus 108 and 109 are shown to control the respective macro level base stations 106 and 107. The control apparatus of a base station can be interconnected with other control entities. The control apparatus is typically provided with memory capacity and at least one data processor. The control apparatus and functions may be distributed between a plurality of control units. In some systems, the control apparatus may additionally or alternatively be provided in a radio network controller.

In FIG. 1 base stations 106 and 107 are shown as connected to a wider communications network 113 via gateway 112. A further gateway function may be provided to connect to another network.

The smaller base stations 116, 118 and 120 may also be connected to the network 113, for example by a separate gateway function and/or via the controllers of the macro level stations. The base stations 116, 118 and 120 may be pico or femto level base stations or the like. In the example, stations 116 and 118 are connected via a gateway 111 whilst station 120 connects via the controller apparatus 108. In some embodiments, the smaller stations may not be provided. Smaller base stations 116, 118 and 120 may be part of a second network, for example WLAN and may be WLAN APs.

The communication devices 102, 104, 105 may access the communication system based on various access techniques, such as code division multiple access (CDMA), or wideband CDMA (WCDMA). Other non-limiting examples comprise time division multiple access (TDMA), frequency division multiple access (FDMA) and various schemes thereof such as the interleaved frequency division multiple access (IF-DMA), single carrier frequency division multiple access (SC-FDMA) and orthogonal frequency division multiple access (OFDMA), space division multiple access (SDMA) and so on.

An example of wireless communication systems are architectures standardized by the 3rd Generation Partnership Project (3GPP). A latest 3GPP based development is often referred to as the long term evolution (LTE) of the Universal Mobile Telecommunications System (UMTS) radio-access technology. The various development stages of the 3GPP specifications are referred to as releases. More recent developments of the LTE are often referred to as LTE Advanced (LTE-A). The LTE (LTE-A) employs a radio mobile architecture known as the Evolved Universal Terrestrial Radio Access Network (E-UTRAN) and a core network known as the Evolved Packet Core (EPC). Base stations of such systems are known as evolved or enhanced Node Bs (eNBs) and provide E-UTRAN features such as user plane Packet Data Convergence/Radio Link Control/Medium Access Control/Physical layer protocol (PDCP/RLC/MAC/PHY) and control plane Radio Resource Control (RRC) protocol terminations towards the communication devices. Other examples of radio access system comprise those provided by base stations of systems that are based on technologies such as wireless local area network (WLAN). A base station can provide coverage for an entire cell or similar radio service area. Core network elements include Mobility Management Entity (MME), Serving Gateway (S-GW) and Packet Gateway (P-GW).

An example of a suitable communications system is the 5G or NR concept. Network architecture in NR may be similar to that of LTE-advanced. Base stations of NR systems may be known as next generation Node Bs (gNBs). Changes to the network architecture may depend on the need to support various radio technologies and finer QoS support, and some on-demand requirements for e.g. QoS levels to support QoE of user point of view. Also network aware services and applications, and service and application aware networks may bring changes to the architecture. Those are related to Information Centric Network (ICN) and User-Centric Content Delivery Network (UC-CDN) approaches. NR may use multiple input—multiple output (MIMO) antennas, many more base stations or nodes than the LTE (a so-called small cell concept), including macro sites operating in co-operation with smaller stations and perhaps also employing a variety of radio technologies for better coverage and enhanced data rates.

Future networks may utilise network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or data storage may also be utilized. In radio communications this may mean node operations to be carried out, at least partly, in a server, host or node operationally coupled to a remote radio head. It is also possible that node operations will be distributed among a plurality of servers, nodes or hosts. It should also be understood that the distribution of labour between core network operations and base station operations may differ from that of the LTE or even be non-existent.

An example 5G core network (CN) comprises functional entities. The CN is connected to a UE via the radio access network (RAN). An UPF (User Plane Function) whose role is called PSA (PDU Session Anchor) may be responsible for forwarding frames back and forth between the DN (data network) and the tunnels established over the 5G towards the UE(s) exchanging traffic with the DN.

The UPF is controlled by an SMF (Session Management Function) that receives policies from a PCF (Policy Control Function). The CN may also include an AMF (Access & Mobility Function).

Figure 2:
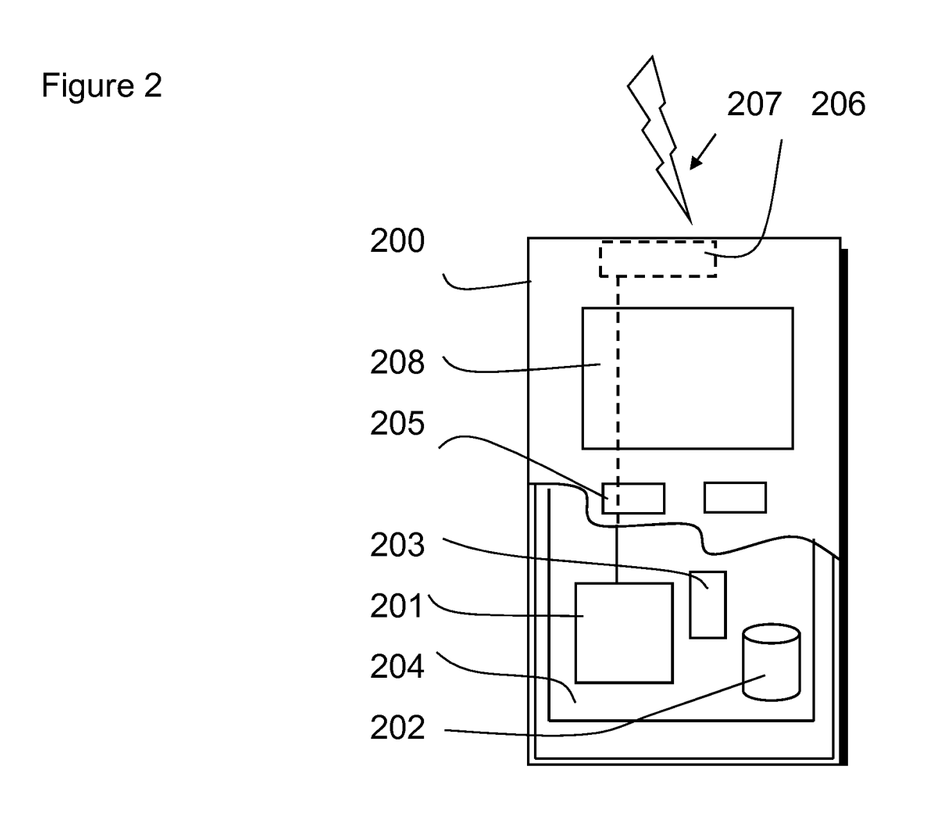
FIG. 2 shows a schematic diagram of an example mobile communication device.

A possible mobile communication device will now be described in more detail with reference to FIG. 2 showing a schematic, partially sectioned view of a communication device 200. Such a communication device is often referred to as user equipment (UE) or terminal. An appropriate mobile communication device may be provided by any device capable of sending and receiving radio signals. Non-limiting examples comprise a mobile station (MS) or mobile device such as a mobile phone or what is known as a 'smart phone', a computer provided with a wireless interface card or other wireless interface facility (e.g., USB dongle), personal data assistant (PDA) or a tablet provided with wireless communication capabilities, or any combinations of these or the like. A mobile communication device may provide, for example, communication of data for carrying communications such as voice, electronic mail (email), text message, multimedia and so on. Users may thus be offered and provided numerous services via their communication devices. Non-limiting examples of these services comprise two-way or multi-way calls, data communication or multimedia services or simply an access to a data communications network system, such as the Internet. Users may also be provided broadcast or multicast data. Non-limiting examples of the content comprise downloads, television and radio programs, videos, advertisements, various alerts and other information.

A mobile device is typically provided with at least one data processing entity 201, at least one memory 202 and other possible components 203 for use in software and hardware aided execution of tasks it is designed to perform, including control of access to and communications with access systems and other communication devices. The data processing, storage and other relevant control apparatus can be provided on an appropriate circuit board and/or in chipsets. This feature is denoted by reference 204. The user may control the operation of the mobile device by means of a suitable user interface such as key pad 205, voice commands, touch sensitive screen or pad, combinations thereof or the like. A display 208, a speaker and a microphone can be also provided. Furthermore, a mobile communication device may comprise appropriate connectors (either wired or wireless) to other devices and/or for connecting external accessories, for example hands-free equipment, thereto.

The mobile device 200 may receive signals over an air or radio interface 207 via appropriate apparatus for receiving and may transmit signals via appropriate apparatus for transmitting radio signals. In FIG. 2 transceiver apparatus is designated schematically by block 206. The transceiver apparatus 206 may be provided for example by means of a radio part and associated antenna arrangement. The antenna arrangement may be arranged internally or externally to the mobile device.

Figure 3:
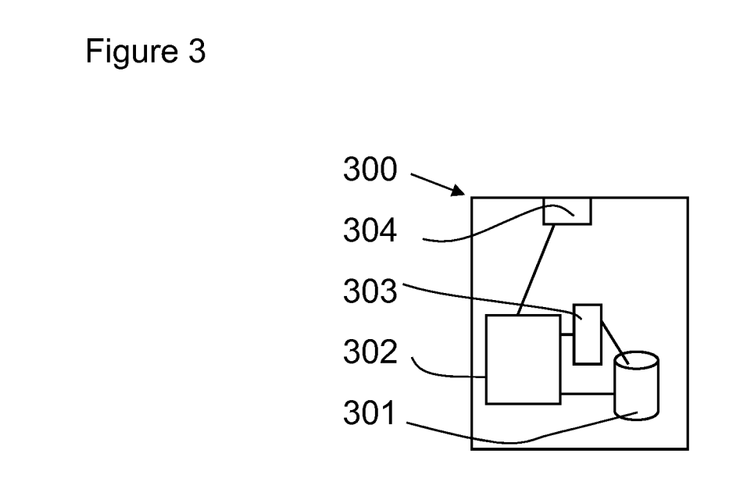
FIG. 3 shows a schematic diagram of an example control apparatus.

FIG. 3 shows an example of a control apparatus 300 for a communication system, for example to be coupled to and/or for controlling a station of an access system, such as a RAN node, e.g. a base station, eNB or gNB, a relay node or a core network node such as an MME or S-GW or P-GW, or a core network function such as AMF/SMF, or a server or host. The method may be implanted in a single control apparatus or across more than one control apparatus. The control apparatus may be integrated with or external to a node or module of a core network or RAN. In some embodiments, base stations comprise a separate control apparatus unit or module. In other embodiments, the control apparatus can be another network element such as a radio network controller or a spectrum controller. In some embodiments, each base station may have such a control apparatus as well as a control apparatus being provided in a radio network controller. The control apparatus 300 can be arranged to provide control on communications in the service area of the system. The control apparatus 300 comprises at least one memory 301, at least one data processing unit 302, 303 and an input/output interface 304. Via the interface the control apparatus can be coupled to a receiver and a transmitter of the base station. The receiver and/or the transmitter may be implemented as a radio front end or a remote radio head.

Carrier Aggregation (CA) was introduced in 3GPP to allow a UE to simultaneous transmit or receive data on multiple component carriers from a single eNB. Carrier aggregation can increase user throughput as the aggregated bandwidth is increased. Carrier aggregation (CA) thus allows combining of multiple component carriers increasing bandwidth and enhancing data rates for users. Carrier aggregation also provides support for non-contiguous spectrum, allowing to more efficiently utilize fragmented frequency resources and allow more options for spectrum re-farming. Additionally, CA provides a multiplexing gain by dynamically distributing traffic over multiple carriers. Thus, for example, originally LTE-A supported CA of up to 5 carriers while later revisions and NR support CA of up to 32 carriers. LTE-A and NR also allow CA of time division duplexing (TDD) and frequency division duplexing (FDD) of carriers, inter-band TDD CA with different uplink-downlink (UL-DL) configurations, and CA with multiple uplink timing advance values.

As a more generic form of carrier aggregation, Dual Connectivity (DC) was introduced in 3GPP to allow a UE to simultaneously transmit and receive data on multiple component carriers from two cell groups via master node (e.g. MeNB or MgNB) and secondary node (e.g. SeNB or SgNB). Dual connectivity can increase user throughput, provide mobility robustness, and support load-balancing among eNBs. In the future it is foreseen that a Multiple Connectivity (MC) could also be introduced to generalize the DC to apply for multiple cell groups.

Additionally, UEs have an associated radio resource control (RRC) mode, for example idle, inactive or connected mode. The different modes involve different levels of RRC control and affect how UE operates. The major functions of the Radio Resource Control (RRC) protocol include connection establishment and release functions, broadcast of system information, radio bearer establishment, reconfiguration and release, RRC connection mobility procedures, paging notification and release and outer loop power control. By means of the signalling functions, the RRC configures the user and control plane operations according to the network status and allows for Radio Resource Management strategies to be implemented.

The operation of the RRC is guided by a state machine which defines certain specific states or modes that a UE may be present in. In this description we refer to RRC modes, however these may also be referred to as RRC states. The different RRC mode in this state machine have different amounts of radio resources associated with them and these are the resources that the UE may use when it is present in a given specific state.

Apart from RRC connected and RRC IDLE modes, NR has introduced a new RRC mode name as RRC Inactive mode. When an UE is powered up it is initially in a DISCONNECTED mode/IDLE mode. It can move to a RRC connected mode with an initial attach or with connection establishment. If there is no activity from UE for a short time, it can suspend its session by moving to RRC Inactive and can resume its session moving to RRC connected mode. Furthermore, a UE can move to RRC IDLE mode from RRC CONNECTED or RRC INACTIVE modes.

The following embodiments relate to LTE but can also be applied to NR where in addition to IDLE mode there is also the Inactive mode.

The concept as discussed in detail hereafter is an attempt to shorten the carrier aggregation or dual/multiple connectivity setup delay and enabling fast offloading to small cells, especially for a UE transitioning from IDLE to CONNECTED at traffic arrival such as mobile originated/mobile terminated (MO/MT) traffic. One typically large delay component for CA/DC set-up relates to the measurements of the candidate cells e.g. in an inter-frequency or inter-site scenario. The concept attempts to improve on the standardized solution which specifies that UE is be configured by the eNB with a list of carriers on which UE can perform extra IDLE mode measurements. This causes the UE at traffic arrival to indicate these measurements to the eNB (if eNB indicates so) and therefore eNB can configure the SCell(s) in small cell layer used for offloading purposes.

Thus, embodiments as discussed in further detail hereafter are configured to provide early and fast reporting of measurements information availability from neighbour and serving cells to reduce delay in setting up of multi-radio-access-technology dual-connectivity (also known as Multi-RAT dual-connectivity or MR-DC) and/or carrier aggregation. These embodiments may also be applied to NR and NR dual-connectivity cases (NR-NR DC) and and/or carrier aggregation. As discussed above these embodiments are applicable to UEs operating in IDLE, INACTIVE and CONNECTED modes. Additionally, in some embodiments the impact on UE power consumption is minimized. Furthermore, according to some embodiments:

1 The UE can be indicated a configuration that causes the UE to measure one or more indicated carriers (e.g. an inter-frequency or inter-RAT carriers) during the IDLE mode.

2 The indication which causes the UE to identify which carrier or carriers to may be included in System Information Block x (for example, if x=5, it would be System Information Block Type 5 (SIB5)) and uses dedicated RRC signalling (including a validity timer controlling how long UE does the measurements).

3 The UE may be configured to indicate the availability of measurements in uplink messages such as RRCConnectionSetupComplete or RRCConnectionResumeComplete.

4 The UE may be provided with a "candidate cell measurement configuration" signal, within a downlink message such as RRCConnectionRelease, that is different from the SIBx configuration message, and which overrides any SIBx configuration message.

5 A validity timer may be only defined for configurations given in a downlink message (e.g. RRCConnectionRelease) message.

6 A UE may be configured to continue performing IDLE mode measurements after cell reselection.

7 If the ongoing IDLE mode measurement is configured only via SIBx in source cell then after cell reselection, if the SIBx of the target cell includes the IDLE mode measurement configuration, the UE may be configured to continue performing IDLE mode measurement and update the configuration according to the SIBx of the target cell.

8 After cell reselection, if the SIBx of the target cell includes no configuration for the IDLE mode measurement, the UE may be configured to stop performing IDLE mode measurement.

9 In order to report the IDLE mode measurements the UE may be configured to wait for an explicit eNB-request for the IDLE mode measurements. The measurements could be reported before or (more typically) after security establishment.

10 In some embodiments a timer (e.g. T331) starts upon downlink message (e.g. RRC Connection release message) containing the timer configuration is received by UE.

11 Additionally in some embodiments a Minimum SCell Signal Quality threshold for reporting may be configured by the eNB.

The embodiments as described herein can in LTE situations use an early measurements approach (in other words determine extra IDLE mode measurements) using the always-on reference signals (CRS), in NR situations they can use a periodic (e.g. every 20 ms, 40 ms, etc) measurement. In some embodiments when in NR situations and a mobility IDLE/INACTIVE mode there can be measurements based on synchronisation signal blocks (SSBs) (also in the case of inter-frequency measurements), and at least on NR secondary synchronisation signals (SSS) and which can be used for DL based radio resource management (RRM) measurement for L3 mobility in IDLE mode.

On the other hand, for CONNECTED mode, the measurements (intra-frequency, inter-frequency, inter-RAT) can be based on SSB and/or CSI-RS. However these signals are on-off reference signals. For example, each CSI-RS transmitted is transmitted per beam. Each synchronisation signal block (SSB) may have an associated CSI-RS (CSI-RS is UE specific).

In the IDLE mode the UE does not have CSI-RS available currently as they consume some network (NW) resources and the NW would typically not retain those resources for a long while, instead keeping them free and not allocated to be used when needed. The embodiments as described herein allows the network resources (e.g. CSI-RS) to be released.

While the terms IDLE and INACTIVE in the application herein nominally refer to different RRC modes in NR, the same ideas are applicable to both with some minor modifications. Unless otherwise noted, use of either "IDLE" or "INACTIVE" refers to both IDLE and INACTIVE RRC mode.

In the embodiments as described herein a UE can be configured with CSI-RS resources to be used while in an INACTIVE RRC mode. The configuration can in some embodiments be controlled by a conditional grant of resources and can be provided by network control. In some embodiments this control can be given by the network together with the other INACTIVE mode configuration information.

In such embodiments the CSI-RS would no longer only be configured for UE's in CONNECTED mode but could also be used by UEs in an INACTIVE RRC mode. The configuration in INACTIVE mode can be conditional (i.e. only applicable under certain conditions) in order to ensure reduced network impact in terms of continuous transmission of CSI-RS to UEs in INACTIVE mode. For example, in situations where those UEs are no longer present in the cell/area where the CSI-RS is transmitted.

In some embodiments there may be different ways to limit the CSI-RS measurements in the INACTIVE mode. In some embodiments the NW limits the CSI-RS transmission (time, area). In some embodiments the UE is configured to limit the measuring of CSI-RS (for example based on measurement quality). In some embodiments both the NW limits the CSI-RS transmission and the UE is configured to limit the measuring of CSI-RS.

In some embodiments the UE can be configured with CSI-RS resources when the connection is released and UE moves from CONNECTED to IDLE (or to INACTIVE) mode.

Alternatively in some embodiments the UE can be configured to retain one or more CSI-RS configurations the UE was given when operating in CONNECTED mode and before the UE releases the CONNECTED mode and moves to IDLE or INACTIVE mode. In some embodiments this retaining of the one or more CSI-RS resources can be implemented autonomously by the UE or could be network-controlled. In other words in some embodiments the network indicates which CSI-RS resources are to be retained.

With respect to the limitation of the CSI-RS transmissions the configuration of the CSI-RS could be limited in one or any combination of following means:

1: Area Validity

Additional to the area limitation, in order to maintain the network efficiency (it is not efficient for the network to keep CSI-RS transmissions active in large area) some additional limitations may be applied and the UE informed as to these additional limitations.

A first additional limitation may be to limit the configuration to be valid only in the cell where UE is released to or camps on when moving to INACTIVE mode from CONNECTED mode.

A further additional limitation may be provide the UE with information which defines a more detailed validity area. For example this additional limitation information may comprise one or more of cell identities, tracking area, RAN area, gNB identities. This information may then in some embodiments be used by the UE to control when and where the UE performs CSI-RS measurements In some embodiments an additional radio-access-network (RAN)/tracking area (TA) area can be defined. In some embodiments this defined area can be a (very) small. This small area would in some embodiments enforce the UE to move to a CONNECTED mode at the cost of signalling resources. In some embodiments an area limitation separate from the RAN/TA area can be employed.

2: Time Validity

As discussed above this time limitation can be employed separately or together with the area limitation rules described.

As the retained CSI-RS may be outdated, in some embodiments the NW can be configured to limit the time during which the CSI-RS configuration(s) is/are valid once the UE has entered INACTIVE state. These limits may be one of the following:

a fixed time (e.g. 2000 ms)

a configured time (e.g. a value within the configuration that also provides the measured CSI-RS resources to UE).

a variable time depending on serving or other cell measurement results (e.g. serving cell measurement result being smaller than a threshold could cause the validity timer to expire or be shortened)

With respect to the UE CSI-RS measurement limitations the configuration of the UE to provide the CSI-RS measurements could be limited by one or any combination of following means:

In some embodiments limitations could be applied regarding the UE measurements to allow power saving. For example in some embodiments a measured parameter (e.g. received signal quantity/quality which may be based on RSRP/RSRQ/CSI-RS) could be indicated to fulfill one or more of the following criteria:

If the measured parameter or parameters (received signal quantity/quality) of a cell or CSI-RS drops below a defined/configured threshold, the UE is configured to stop measuring one or more CSI-RS signals (UE would no longer be required to measure one or more CSI-RS signals). This for example may be implemented to avoid unnecessary power consumption. In such embodiments this may be in case the network switches off the CSI-RS signals at some point for power saving purposes.

Furthermore in some embodiments if the measured parameter or parameters (which expresses a cell signal quality/quantity measurement(s)) is above a threshold (which could be the same threshold as the previous threshold or a different threshold), the UE could be configured to resume the CSI-RS signal measurements.

Additionally, in some embodiments the UE may be configured to resume measurements on CSI-RS if a measured parameter or parameters (received signal quantity/quality) which are other than CSI-RS) are above a threshold.

Figure 4:
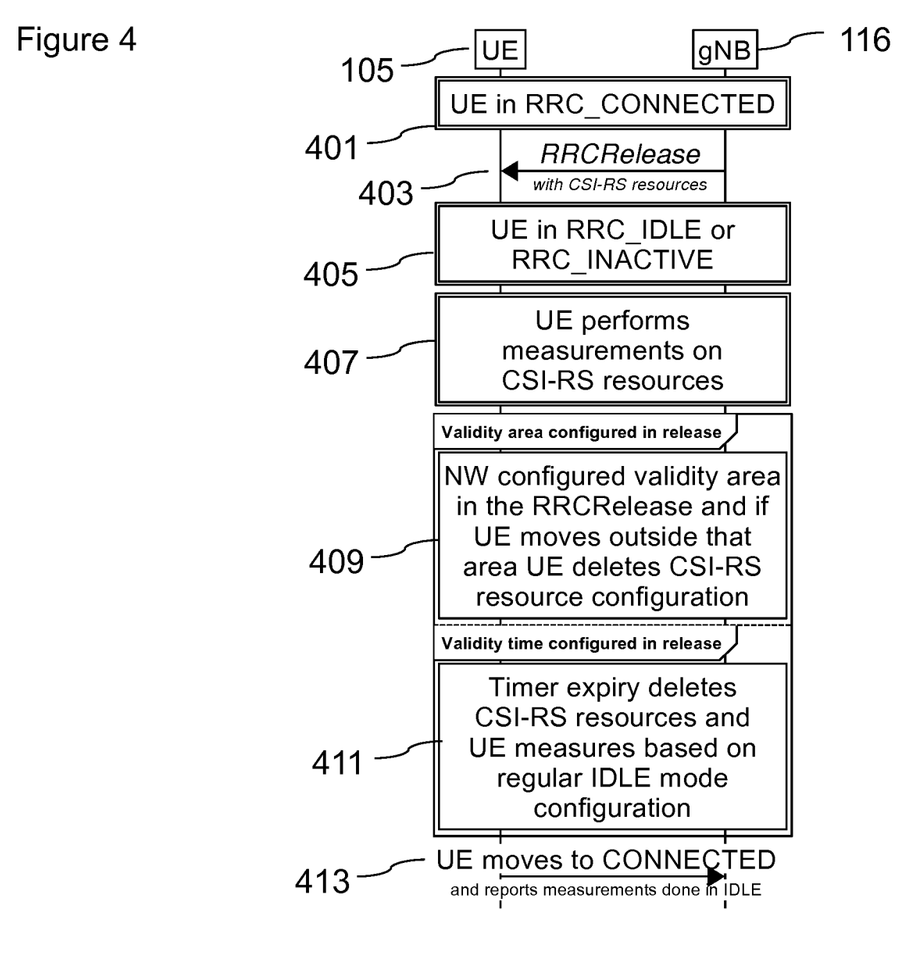
FIG. 4 shows an example block diagram of dual connectivity/carrier aggregation within New Radio networks.

With respect to FIG. 4 the operation of apparatus implementing some embodiments is shown herein.

In this example is shown the UE 105 and the gNB 105. In this example the UE is initially shown operating in the RRC_CONNECTED mode as shown in FIG. 4 by step 401.

The gNB 116 is then configured to generate and transmit a RRC release message which is received by the UE 115 as shown in FIG. 4 step 403. The gNB (network) could within the RRC release message contain information which causes the UE to be configured with the CSI-RS resources (or indicate the storage of configured CSI-RS) to be used in IDLE (or INACTIVE) mode.

The UE having received the RRC release message can then enter IDLE (or INACTIVE) mode as shown in FIG. 4 by step 405.

The UE can then use the configured CSI-RS to perform measurements as shown in FIG. 4 by step 407. These measurements are likely in addition to or in complement to SSB based measurements.

In some embodiments the UE is configured to measure CSI-RS (or use the configured CSI-RS for measurements when needed) until either of the stop criteria are fulfilled.

This stop criteria may be contained by a configured validity area which was signalled by the release message as shown in step 409 and thus when the UE moves outside of the area the UE is configured to delete the CSI-RS resource configuration.

This stop criteria may be contained by a configured validity time which was signalled by the release message as shown in step 411 and thus when the UE timer expires the UE is configured to delete the CSI-RS resource configuration and the UE is configured to measure using regular IDLE configuration methods.

Additionally as described above the stop criteria may be based on a measured parameter (received signal quantity/quality) which goes below threshold (for example a received signal cell quantity and/or CSI-RS quantity).

This can continue furthermore in some embodiments until the UE moves to CONNECTED mode and report measurements are performed in IDLE mode as shown in FIG. 4 by step 413.

Figure 5:
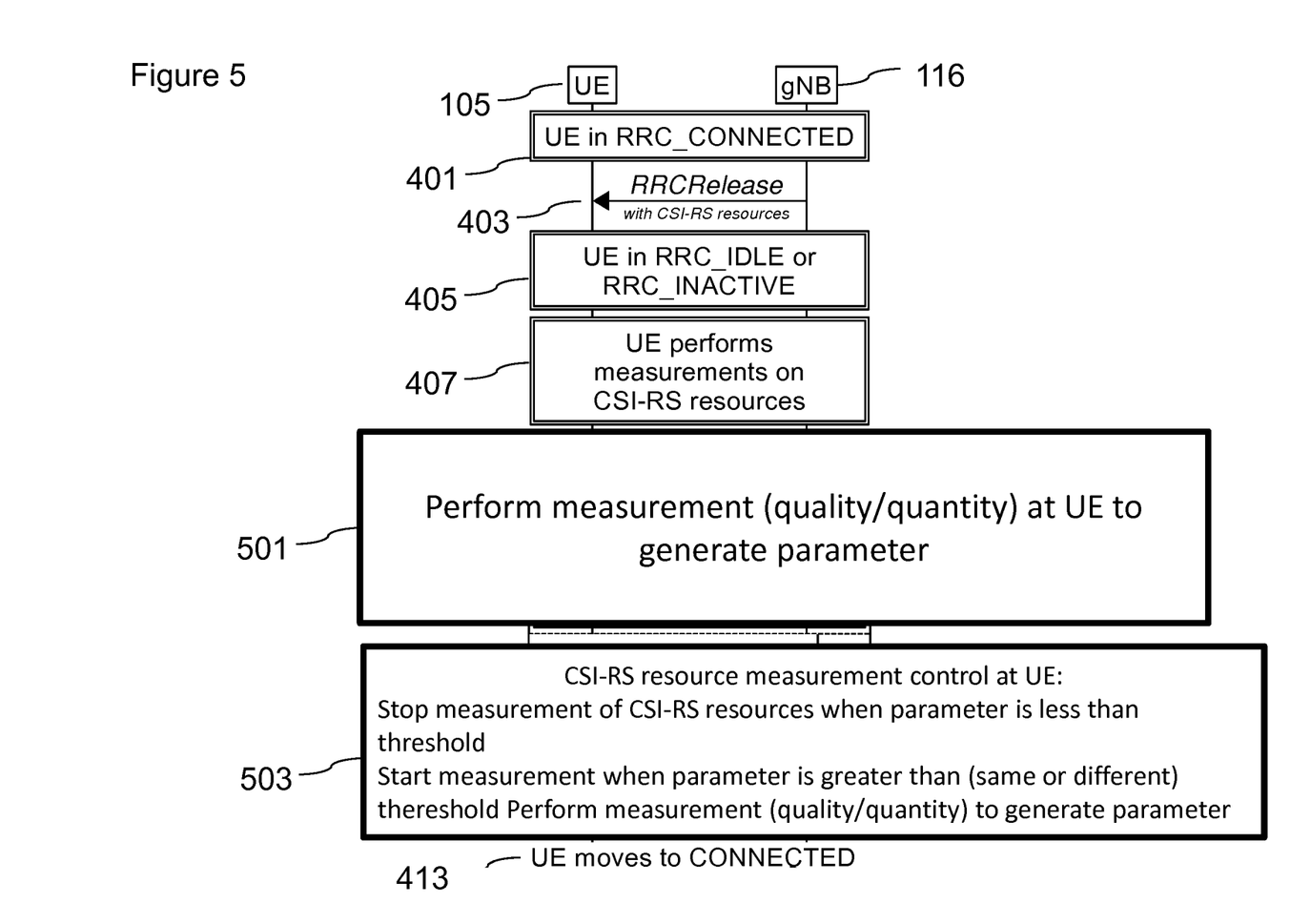
FIG. 5 shows a flowchart of a method according to an example embodiment.

In some other cases the NW (the gNB) can keep transmitting the CSI-RS, but UE limits when the measurements are done or not. An example of this is shown in FIG. 5. FIG. 5 shows the same steps 401, 403, 405, and 407 as described earlier in FIG. 4.

Then the next operation is one of performing the measurement of the parameter (which can be based on RSRP/RSRQ/CSI-RS or any suitable measurement as shown in FIG. 5 by step 501.

The next operation is performing a CSI-RS resource measurement control as shown in FIG. 5 by step 503. For example in some embodiments the UE is configured to determine when the measurements are performed based on a measured quantity fulfilling a determined criterion:

For example in some embodiments the CSI-RS measurements are performed based on whether the measured parameter (this could be based on RSRP/RSRQ/CSI-RS etc.) drops below a defined/configured threshold. Thus when the quality is below the threshold the UE no longer measures CSI-RS. In such a manner it avoids unnecessary power consumption.

In some embodiments where cell quality measurements improve above the same or a different threshold, the measurements could be resumed.

In some embodiments the NW (for example gNB) stops transmitting CSI-RS. In one example this is not informed to the UE and the UE would first measure a low quality and then it would soon stop measuring (such as shown in the example shown in FIG. 5).

In some further embodiments the network is configured to stop transmitting CSI-RS after a given period of time. This period of time could be explicitly configured to the UE. In some embodiments this could be based on implicit timer based on release of connection etc.

In some embodiments the CSI-RS configuration is limited in time and has an associated timer value which when this value is reached the UE deletes the configuration information or stops using it. For example in some embodiments this timer is 2 seconds.

In some embodiments UE movement may cause the stopping of measurements:
  this could be based on above mentioned parameter measurement quantity or any other suitable means of detecting movement;
  this could be based on the change of best beam which can cause the UE to stop making CSI-RS measurements.

The methods may be implemented in a communication device 200, e.g., a user equipment, as described with reference to FIG. 2 or a control apparatus 200, e.g., a gNB, as described with reference to FIG. 3.

It should be understood that the apparatuses may comprise or be coupled to other units or modules etc., such as radio parts or radio heads, used in or for transmission and/or reception. Although the apparatuses have been described as one entity, different modules and memory may be implemented in one or more physical or logical entities.

Although certain embodiments were described above by way of example with reference to certain example architectures for wireless networks, technologies and standards, embodiments may be applied to any other suitable forms of communication systems than those illustrated and described herein.

It is also noted herein that while the above describes example embodiments, there are several variations and modifications which may be made to the disclosed solution without departing from the scope of the present invention.

In general, the various embodiments may be implemented in hardware or special purpose circuitry, software, logic or any combination thereof. Some aspects of the invention may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As used in this application, the term "circuitry" may refer to one or more or all of the following:
(a) hardware-only circuit implementations (such as implementations in only analog and/or digital circuitry) and
(b) combinations of hardware circuits and software, such as (as applicable):
(i) a combination of analog and/or digital hardware circuit(s) with software/firmware and
(ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation."

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

The embodiments of this invention may be implemented by computer software executable by a data processor of the mobile device, such as in the processor entity, or by hardware, or by a combination of software and hardware. Computer software or program, also called program product, including software routines, applets and/or macros, may be stored in any apparatus-readable data storage medium and they comprise program instructions to perform particular tasks. A computer program product may comprise one or more computer-executable components which, when the program is run, are configured to carry out embodiments. The one or more computer-executable components may be at least one software code or portions of it.

Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD. The physical media is a non-transitory media.

The memory may be of any type suitable to the local technical environment and may be implemented using any suitable data storage technology, such as semiconductor based memory devices, magnetic memory devices and systems, optical memory devices and systems, fixed memory and removable memory. The data processors may be of any type suitable to the local technical environment, and may comprise one or more of general purpose computers, special purpose computers, microprocessors, digital signal processors (DSPs), application specific integrated circuits (ASIC), FPGA, gate level circuits and processors based on multi core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The foregoing description has provided by way of non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims. Indeed, there is a further embodiment comprising a combination of one or more embodiments with any of the other embodiments previously discussed.

The invention claimed is:

1. An apparatus, comprising:
   at least one processor; and
   at least one memory including computer program code, the at least one memory and computer program code being configured, with the at least one processor, to cause the apparatus to perform:
   receiving a first message, the first message comprising reference signal resource information for measuring channel state information; and
   when operating the apparatus in a first radio resource control mode, measuring channel state information based on a reference signal of the channel state information,
   wherein the at least one memory and computer program code are further configured, with the at least one processor, to cause the apparatus to, when operating the apparatus in a first radio resource control mode, measure channel state information based on a reference signal of the channel state information is further for controlling the measuring of the channel state information based on the reference signal reference signal of the channel state information based on an area condition and a time condition,
   wherein the controlling the measuring of the channel state information based on the reference signal reference signal of the channel state information based on the area condition further comprises:
   limiting measurement of the channel state information based on the reference signal reference signal of the channel state information to an area based on area information within the first message, the area information within the first message comprising a radio access network area, at least one qNB identity, at least one cell identity, and at least one tracking area,
   wherein at least one memory and computer program code are further configured, with the at least one processor, to cause the apparatus, when operating the apparatus in the first radio resource control mode, to control the measuring of the channel state information based on the reference signal of the channel state information based on at least one measurement parameter, and
   wherein the at least one memory and computer program code are further configured, with the at least one processor, to cause the apparatus to measure the at least one measurement parameter, wherein the measuring the at least one measurement parameter comprises measuring the at least one measurement parameter based on: Reference Signal Received Power, Reference Signal Received Quality, received beam information, and channel state information—reference signal.

2. The apparatus as claimed in claim 1, wherein the at least one memory and computer program code are further configured, with the at least one processor, to cause the apparatus to perform utilizing the measured channel state information based on the reference signal of the channel state information to control the apparatus changing from the first radio resource control mode to a second radio resource control mode.

3. The apparatus as claimed in claim 2, wherein the at least one memory and computer program code are further configured, with the at least one processor, to cause the apparatus to operate in the first radio resource control mode based on at least one of:

the received first message; and
a received second message.

4. The apparatus as claimed in claim 1, wherein the controlling the measuring of the channel state information based on the reference signal reference signal of the channel state information based on the time condition further comprises one of:
limiting measurement of the channel state information based on the reference signal reference signal of the channel state information to a time following the transition to the first radio resource mode based on time information within the first message; and
limiting measurement of the channel state information based on the reference signal reference signal of the channel state information to a time following the transition to the first radio resource mode based on a fixed predetermined time.

5. The apparatus as claimed in claim 1, wherein the controlling the measuring of the channel state information based on the reference signal of the channel state information based on the at least one measurement parameter further comprises:
limiting measurement of the reference signal of the channel state information when the measurement parameter is less than a determined threshold value; and
starting or restarting measurement of the reference signal of the channel state information when the measurement parameter is greater than a further determined threshold value.

6. An apparatus, comprising:
at least one processor; and
at least one memory including computer program code, the at least one memory and computer program code being configured, with the at least one processor, to cause the apparatus to perform:
providing, to a user equipment a first message, the first message comprising reference signal resource information for measuring channel state information;
causing the user equipment, when the user equipment is in a first radio resource control mode, to measure channel state information based on a reference signal of the channel state information based on the reference signal resource information,
wherein the at least one memory and computer program code are further configured, with the at least one processor, to cause the apparatus to limit transmitting of the reference signal of the channel state information to the user equipment based on an area condition and a time condition,
wherein the limiting transmitting of the reference signal of the channel state information to the user equipment based on the area condition further comprises:
limiting transmission of the reference signal of the channel state information to an area based at least on a radio access network area, at least one qNB identity, at least one cell identity, and at least one tracking area.

7. The apparatus as claimed in claim 6, wherein the measured channel state information based on a reference signal of the channel state information is for assisting the user equipment transition from the first radio resource control mode to a second radio resource control mode.

8. The apparatus as claimed in claim 7, wherein the first message comprises information to cause the user equipment to transition to the first radio resource control mode.

9. The apparatus as claimed in claim 8, wherein the limiting transmitting of the reference signal of the channel state information to the user equipment based on the area condition further comprises one of:
limiting transmission of the reference signal of the channel state information to a time following the transition of the user equipment to the first radio resource mode based on time information within the first message;
limiting transmission of the reference signal of the channel state information to a time following the transition of the user equipment to the first radio resource mode based on serving or other cell measurement results; and
limiting transmission of the reference signal of the channel state information to a time following the transition to the first radio resource mode based on a fixed predetermined time.

10. The apparatus as claimed in claim 9, wherein the first radio resource mode is one of an IDLE radio resource mode, and an INACTIVE radio resource mode.

11. The apparatus as claimed in claim 7, wherein the second radio resource mode is a CONNECTED radio resource mode.

12. A method, comprising:
providing, to a user equipment a first message, the first message comprising reference signal resource information for measuring channel state information;
causing the user equipment, when the user equipment is in a first radio resource control mode, to measure channel state information based on a reference signal of the channel state information based on the reference signal resource information,
limiting transmitting of the reference signal of the channel state information to the user equipment based on an area condition and a time condition,
wherein the limiting transmitting of the reference signal of the channel state information to the user equipment based on the area condition further comprises:
limiting transmission of the reference signal of the channel state information to an area based at least on a radio access network area, at least one gNB identity, at least one cell identity, and at least one tracking area.

\* \* \* \* \*